Patented Apr. 18, 1944

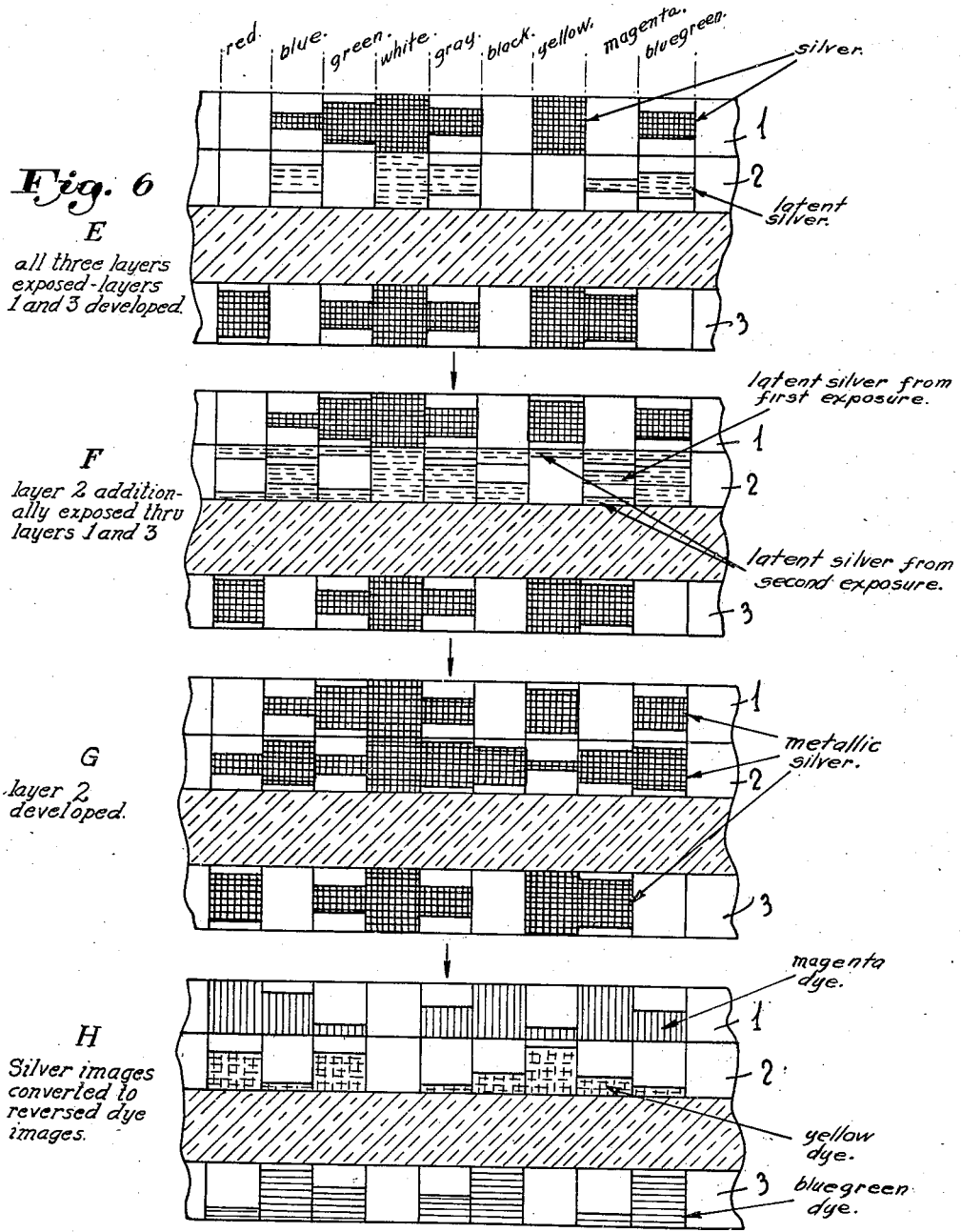

2,347,119

UNITED STATES PATENT OFFICE 2,347,119

PROCESS FOR PRODUCING PHOTOGRAPHIC MULTICOLOR PICTURES

Walter Michaelis, Camp de St. Cyprien (P. O.), France; by decree of distribution to Hella Michaelis, assignor, by mesne assignments, to Chromogen, Incorporated, a corporation of Nevada Application November 15, 1940, Serial No. 365,830
In Switzerland November 15, 1939

14 Claims. (Cl. 95—2)

Color pictures comprising a plurality of monochrome partial pictures have already been produced in a multi-layer material. The multicolor effect of these pictures is due to the combined action of the different colors, and more particularly a yellow dye, a magenta and a blue-green dye, which yield a great variety of colors in accordance with the subtractive principle of color-reproduction. Theoretically each of the three dyes should absorb the light of one spectral third only whilst totally transmitting the light of the two other thirds of the visible spectrum. It is, however, a known fact, that most of the dyes used in practice are not sufficiently transparent for light which they should transmit. This is one of the main obstacles to obtaining a theoretically perfect color-reproduction. Moreover, in a color photograph, it is not only the correct reproduction of the colors that counts, but the grey-values must be reproduced also in a satisfactory manner.

It is one object of the present invention to improve the color-reproduction, and the printing qualities of a taking material, by a simple method of processing the multi-layer material. Further objects of the invention will become apparent from the following description and the drawings, which describe and illustrate the principles of the process, its essential features and its results. Attention should be directed, further to my prior U. S. patents and patent applications which relate to multicolor-photographic processes and in the carrying out of which the present invention may be used.

Fig. 6 is a flow diagram in which E illustrates schematically an intermediary stage of my process and shows a three-layer film (in cross section) into the layers of which the three color separation pictures of a color test chart have been printed. Two of the color separation records are in the form of metallic silver, the third record is still undeveloped; and F represents the same film after the film has been exposed additionally from both sides. G is an illustration of the film after development has been completed; and H shows the finished film with the part images differently colored.

Figure 1:
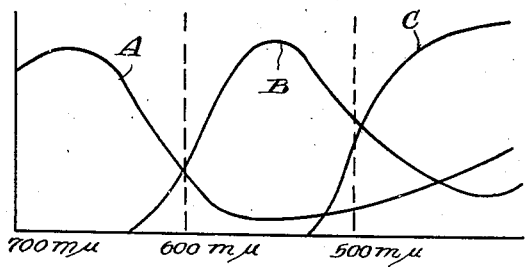
Fig. 1 shows the absorption curves of a blue-green dye (curve A), a magenta dye (curve B), and a yellow dye (curve C)

The absorption curves A, B and C of Fig. 1 show the optical density of the three dyes plotted against the wave-lengths of the visible spectrum. The spectrum is subdivided, by dotted lines, into three ranges each of which extends over about one third of the visible spectrum. The spectral ranges shall be called the blue (400 to 500 mu), the green (500 to 600 mu) and the red spectral regions (600 to 700 mu). The absorption of the bluegreen dye concerns chiefly light of the red spectral region (curve A); the magenta dye absorbs predominantly within the green spectral region (curve B); the main absorption of the yellow dye (curve C) extends over the blue spectral third. Curves A and B, however, show that also the bluegreen and the magenta dye absorb blue light to a remarkable extent.

Figure 2:
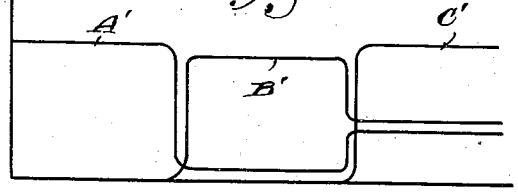
Fig. 2 shows three curves A', B', and C', which illustrate the absorption characteristics of the same dyes in a more schematical manner.

The function of the dye components in a subtractive dye combination can be illustrated more clearly by the broken curves of Fig. 2 than by the actual absorption curves shown in Fig. 1. The broken curves A', B', and C' represent the optical density not plotted against the individual wave-lengths, but the average density with respect to the three thirds of the spectrum. Color effects are obtained, with the subtractive method, by passing white light through a combination of dyes, each of which absorbs a certain spectral range, but transmit light of a different spectral composition which may be absorbed or partly absorbed by the other components of the dye combination. The color effect obtained depends upon the mutual ratio of the dyes in the combination. There is an almost indefinite range within which the mutual ratio of the dyes can be varied and hence an almost indefinite scale of color effects can be obtained at the different points of a subtractive multi-color image.

Figure 3:
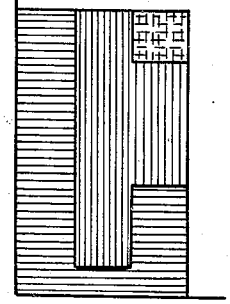
Fig. 3 is a schematical illustration of the summary absorption of the three dyes in combination. It shows the contribution of the individual dyes to the total absorption of a grey combination of dyes.
Figure 5:
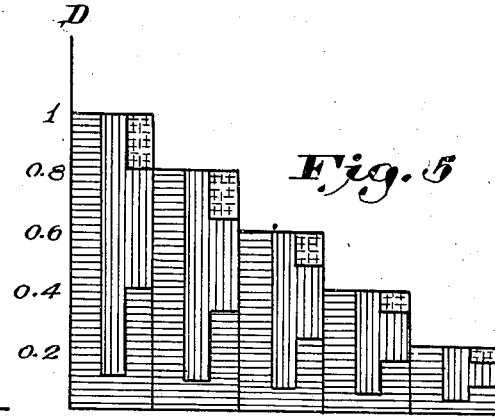
Fig. 5 shows a scale of grey combinations of graded optical density, each grey value of the scale being represented by a combination of the kind illustrated in Fig. 3.

A combination of dyes appears as a neutral grey, if it acts to weaken the intensity of white light without altering its spectral composition, so that the red, the green and the blue spectral components of the incident white light are absorbed to the same extent. Supposing, that dyes of optimal spectral characteristics were available, i. e., dyes the absorption of which concerns one single spectral region alone, the production of a neutral grey combination would necessitate only, that the dyes are combined in such a ratio that the average optical densities are equal. As matter of fact, however, as shown in Figs. 1 and 2 the actual dyes are far from having ideal properties: the bluegreen dye absorbs not only red light and the magenta dye absorbs not only green light, but each of these two dyes absorbs also blue light to a non-negligible extent. Hence the yellow dye must participate in a grey combination with a relatively low density only, in order that the three dyes acting in combination will absorb no more blue light than the bluegreen dye absorbs red light or than the magenta and bluegreen dye together absorb green light. Fig. 3 illustrates schematically the combination of three dyes to a neutral grey. It shows the average optical density of the individual dyes with respect to the three spectral thirds as well as the total density of the grey combination, the total density being the sum of the individual densities and being the same in all three spectral thirds. Of course, this total optical density is higher in the case of a dark grey and lower in the case of a light grey, and there exists a full scale of grey combinations between white and black. A series of grey combinations having densities between 0.2 and 1.0 are arranged, in Fig. 5, in the manner of a graded density wedge. The manner of illustration chosen in Figs. 3 and 5 makes it particularly clear that the yellow dye contributes only a little to the total effect of the dye combination. There are a great number of color-photographic processes and pictures, in which the full black parts are formed where all three dyes are present, each in the highest concentration to be found in the picture. If such is the case, Fig. 3 represents also the density ratio of the purest colors: the most saturated yellow, the most saturated magenta and the most intense bluegreen, the combination of which is the darkest grey. It will be recognized, that the most intense yellow which can be found at those parts of the picture where neither magenta nor bluegreen dye are present, has merely a relatively low density which is insufficient for a satisfactory reproduction of a brilliant yellow color.

Figure 4:
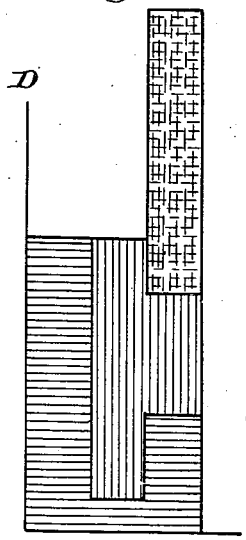
Fig. 4 shows in a similar manner the summary effect of the same dyes in a combination, in which each individual dye possesses, within the range of its predominant absorption, the same average optical density as the other dyes possess in their respective absorption ranges. Such combination is not a neutral grey, but shows a distinct color tinge.

For an adequate reproduction of the colors and more particularly of a brilliant yellow it is necessary to have the yellow dye present in such a concentration at the places of the picture where both the bluegreen dye and the magenta are lacking, that the yellow dye, by itself alone, absorbs approximately as much blue light as the bluegreen dye absorbs red light. If, however, the yellow dye is provided in the high concentration required at the pure yellow picture areas, this dye in combination with the two others—at places where all of them are present, each in maximum concentration or all of them in the ratio of the maximum concentrations—would not yield the result illustrated in Figs. 3 and 5, but a combination as shown in Fig. 4, for instance. Such a combination is not a black or grey color. Thus in a case where the reproduction of brilliant colors is the goal, it is difficult to obtain at the same time a correct reproduction of the grey values. Either the colors reproduced by the subtractive method and involving the participation of mainly the yellow dye, the pure red and the pure green on the one hand, or the grey and black values on the other hand are not correctly reproduced.

The above discussion of the conditions to be observed in the reproduction of the black and white values and the contrary conditions to be fulfilled for the reproduction of the colors, makes it evident, that a dye should be produced with a high density at those points where the dye alone is present, but with a relatively lower density of the same dye, where it participates in dye combinations in which other dyes fulfil partly its function of absorbing certain light rays. This is especially the case with the yellow dye, but under various conditions, it may apply also to one of the other dyes. In the following description it shall be assumed that it is the yellow dye image which is to be influenced by the process of the invention.

The invention affords the possibility during the production of a multicolor picture in a multilayer material of producing the color in such a manner that at places where a dye forms a combined color or grey by the superposition of another dye, its density is relatively lower than at parts of the multicolor picture where the one dye alone is present. Relatively lower density and higher density means that areas of equal color sensation values show different color intensity. The invention can be used for improving the production of multicolor picture printing prototypes, the requirements of color-reproduction as well as the conditions necessary for a correct reproduction of the grey-values being taken into account. The invention may be used also in other cases for compensating deficiencies which are due to the preponderance of one of the dyes.

In carrying out the invention, latent images are produced in the inseparably united silver halide emulsion layers of a multi-layer film, the latent images representing the different color separation records of the multicolored object and being formed in any known manner by an original exposure or by a printing operation. According to the invention the development of one of the layers is influenced, by the image developed within another layer, in such a way that the silver deposit is developed in the first-named layer to a density which is the higher, the smaller the amount of silver developed at the corresponding points of the second-class layer.

I may, for example, develop the latent images with a common developer. Such a developer should have the property of exhaustion; i. e., when penetrating one layer and developing the silver image therein it should maintain its activity at the places where no silver has been produced in the layer, but should lose its developing power proportionally to the developed silver; with a developer having this property the process of development, in the lower layer, proceeds more vigorously at those areas where the first developed layer contains only small amounts of silver. If now the silver images in both layers are converted into dye images by any desired process which acts to substitute a dye or pigment for the silver, a relatively high density of dye is obtained in the lower layer, where small amounts of dye are formed in the upper layer, and a relatively low dye concentration is obtained in the lower layer, where the upper layer is intensely colored. When it is desired to influence the yellow dye image, the layer destined for this image is arranged as the lowest layer or as one of the lower layers and the time of development, the developer and the temperature are so chosen that a developing test representing a color test chart yields neutral grey values on the one hand and a brilliant yellow of high saturation on the other hand.

In the preferred form of carrying out the invention, I first develop the latent image in one layer or in two of the three layers without developing or completely developing the latent image within the other layer or layers. I use the metallic silver images thus produced or one of them as a mask during a further, additional exposure of the still undeveloped layer. The layer thus exposed a second time is thereupon developed and the metallic silver images are converted into dye images of different color. Any process for producing dye images may be used which yields the highest color density where no silver is present and the smallest color-density at the places of the densest silver deposit.

For the carrying out of the fractionated development in combination with an intermediary exposure multi-layer materials may be used, which have difficulty developable silver salt in one layer and a readily developable silver halide in another layer. But there may be used also multi-layer materials composed of substantially identical emulsion layers. The layers are arranged in the appropriate sequence, possibly with the interposition of plain gelatin layers, which render the interruption of the development easier.

In carrying out the fractionated development, it is possible to bathe the developed, but still unfixed surface layer in a potassium iodide solution. The silver salt in these layers is rendered resistant to developers of low reduction potential and such a developer is used for the development in the lower layer.

In other cases the development may be allowed to continue in the upper layers during the development of the lower layer, as the silver deposit in the upper layers is already formed almost completely and the additional silver formed can be neglected.

For the fractionated development a rapid surface developer of low depth-action is to be recommended, with the addition of diffusion-retarders, if desired, in order to restrict the developing effect to the upper layer or layers. The choice of a suitable developer and the proper time of development is, preferably, based upon a preliminary test: To this end the color separation records are printed into three non-superposed sections of the multi-layer film, each record into its corresponding layer. A series of such test prints is developed, each individual print of the series being identically exposed but developed for a different time. From the series of test images thus obtained that image will be selected which shows the part image completely developed in the upper layer but no image or only a slightly developed image in the lower layer. A formula of a suitable developer has been made public by the Eastman Kodak Company under the term "D82." The time of development depends upon the thickness and the permeability of the layers and is, in general, between 1 and 2 minutes.

For the supplementary exposure of the still undeveloped layer there is used light of a spectral composition for which this layer is sensitive, but which is transmitted and not recorded at the transparent areas of the superposed layer. White light may also be used, if the surface layer is fixed subsequent to the first development. The additional exposure of the still undeveloped layer behind the already developed part image has the following effect: Behind the unexposed areas of the already developed layer—i. e., behind the areas which will receive the most intense coloration during the subsequent production of the dye images—the maximum exposure occurs with the consequence that the yellow dye cannot participate in full concentration as part of the combination of super-imposed dyes, when, as in the present case, the dye images are formed by a process which yields the dye in inverse proportion to the silver. Behind the most intensely blackened areas of the developed part picture— where this part picture will be without dye—the additional exposure does not affect the lower layer and the yellow dye can reach its maximum density. The time intensity product light value (I. T.-value) of the additional exposure depends upon the characteristics of the dyes and upon the mutual relation between the dye concentrations which would be obtained without an additional exposure. In general, the I. T.-value of the supplementary exposure is between one tenth and half of the I. T.-value applied before in the exposure of the layer.

For the conversion of the silver images into dye images all methods are applicable which yield the maximum dye concentration at those areas of the layer, where the minimum I. T.-value is recorded, and which yield the lowest dye concentration at the most exposed areas. If, for example, the process of color-development is to be used, the processing is such that the unexposed silver halide, still present in the layers after the first exposure, the first development, the supplementary exposure and the second development, is exposed totally and thereafter developed by means of a color developer. Especially suitable for the production of the dye images are, further, those processes which act to destroy the dye locally at the points of the metallic silver produced in a uniformly dyed layer, whilst leaving the dye undestroyed where no silver is present. In the following example the dye images are produced by means of local dye destruction.

A light-sensitive film is used, which carries on the one side of a transparent support a blue-sensitive, bluegreen dyed silver halide emulsion layer, and which carries on the other side of the carrier a yellow-dyed panchromatic layer and a blue-sensitive magenta-dyed silver halide emulsion layer. The magenta layer is coated on the panchromatic layer and an intermediary gelatin layer, colorless or colored by means of a removable yellow filter dye, may be present between the superposed layers. For dyeing the silver halide emulsion layers there are used azo-dyes which are bleachable, by thiocarbamide or hydrohalic acid solutions, in the presence of metallic silver. Suitable dyes are, for instance,

|  | Schultz Farbstafftabellen |
|---|---|
| Diamin-Reinblau FF | Vol. 1, 7th ed., 1931, No. 510 |
| Congo-Reinblau | Vol. 1, 7th ed., 1931, No. 513 |
| Tuchecht-brillantrot 2 B | Vol. 2, 7th ed., 1932, p. 221 |
| Polar brillantrot 3 B | Vol. 2, 7th ed., 1932, p. 175 |
| Supranol-brillantrot | Vol. 2, 7th ed., 1932, p. 204 |
| Chloramin-brillantrot 8 B | Vol. 1, 7th ed., 1931, No. 425 |
| Chrysophenin | Vol. 1, 7th ed., 1931, No. 726 |
| Xylenwolkgelb G | Vol. 2, 7th ed., 1932, p. 232 |

The dyes are present in the individual layers in such a concentration as is required for the reproduction of the saturated colors and especially of a brilliant yellow. The magenta, the bluegreen and the yellow dye together thus absorb more blue light than red light and green light; the combination of the three dyes is not black or dark grey, but of a reddish tinge, and all other combinations, formed by the dyes in the ratio of the maximum concentration, are not grey but reddish or brownish.

For the printing into the three layers of the light sensitive material there are used, in this example, three separate positive printing prototypes. The term "printing prototype" is used for the image to be reproduced photographically and arranged between the source of printing light and the light sensitive printing layer. One of the prototypes used represents the red color sensation, the second one is a record of the green color sensation, and the third printing prototype is a record of the blue color separation picture. The multicolor image to be reproduced may be assumed to be a color test chart. The red color separation record is printed with blue printing light into the bluegreen dyed layer. From the opposite side there are printed the two other color separation records into their corresponding layers: the blue-sensation record with red printing light into the yellow emulsion layer, the green-sensation record with blue printing light into the magenta layer. The I. T.-values required for these printing operations are determined by means of a preliminary test. For this purpose each layer is exposed separately through its corresponding printing light filter with graded I. T.-values. The film is then developed and thereupon treated with the dye destroying bath. The time intensity product light values which yield enough silver for the total destruction of the dye are thereby determined, as well as the I. T.-values which under the same conditions do not produce a silver deposit of sufficient density for a noticeable dye-destruction. The printing characteristics of the positive printing prototypes are chosen in accordance with the results of the test. The range of light values to be reproduced in colors shall be identical for all color separation prototypes and in each individual prototype the density representing the upper limit and the density representing the lower limit of this range shall be such, that the former transmits the I. T.-value equivalent to a silver deposit sufficient to destroy totally the dye in the corresponding layer, whilst the latter transmits only the light value which is equivalent to a silver deposit still incapable of affecting the dye; for the determination of these I. T.-values graded density wedges of the kind described in my prior U. S. Patent No. 2,223,008, patented November 26, 1940, may be used. Printing prototypes having the above properties are prepared or selected in any desired manner, printed and the prints developed as follows:

The exposed film is treated for one minute at 18° C. with a developer of the following formula:

| | | |
|---|---|---|
| Water | cc | 750 |
| Methanol | cc | 48 |
| Metol | g | 14 |
| Sodium sulphite sicc | g | 52.5 |
| Hydroquinone | g | 14 |
| Sodium hydroxide | g | 8.8 |
| Potassium bromide | g | 8.8 | diluted with water to form 1 litre developer.

The developed film is immersed for one minute into an acetic acid 1% solution in order to stop the developing process. Silver pictures are formed, by the treatment described, in the bluegreen dyed layer on the one side of the support and also in the magenta dyed top emulsion layer on the other side of the carrier, but the latent image in the yellow dyed middle layer is still undeveloped or scarcely affected. The film is thereupon moved in front of a green light source which illuminates the bluegreen side of the film and in front of a red light source which faces the magenta layer. The intensity of the light sources or the distance between the lamps and the film or the duration of the illumination may be varied in such a manner, that the yellow dyed emulsion layer is exposed through the totally transparent areas of the outer layers with time intensity product light values which are about 20% and 40% of the light values employed originally for the exposure of the yellow layer. The exact dosage of light may be given dependent upon a test, in which light of graded I. T.-values is used for the illumination of a grey scale reproduction on the film. Without, or with insufficient additional exposure the greys will be reddish or brownish; with an overdosage of light they become bluish.

After the supplementary exposure the film is led through a developer. The developer used may be the same as has been used for the first development or it may be of a different composition suitable for developing the yellow layer. After the yellow dyed emulsion layer has been developed, the film is fixed in the usual manner, rinsed and treated with a dye destroying bath of the following formula:

| | | |
|---|---|---|
| Thiocarbamide | g | 3.5 |
| Hydroquinone | g | 2.0 |
| Chromium alun | g | 2.5 |
| Conc. sulfuric acid | g | 0.5 |
| Water | cc | 100 |

Instead of the thiocarbamide solution, there may be used other dye destroying solutions, such as a hydrobromic acid 5% solution. After the dye destruction the silver is converted with cupric chloride solution into a silver salt, which is dissolved with hypo.

The characteristic steps of the above described example are illustrated schematically in Fig. 6. Each of the steps in this flow diagram shows a cross-section through a film which carries two emulsion layers 1 and 2 on the one side and a third emulsion layer 3 on the other side. In layer 1 of the material there are shown nine sections, some of which are totally blank, whereas the others are filled more or less with blackened portions. The presence of a blackening within an area indicates the presence of metallic silver uniformly distributed in the respective area; and the ratio between the blackened portion and the whole area symbolizes the density of the silver deposit. The distribution of the silver indicated in layer 1 is characteristic for the green-filter-negative of a test chart, the colors of which are: red—blue—green—white—grey—black—yellow—magenta—bluegreen.

In the corresponding sections of layer 3 the distribution and the degree of the blackenings represents the red-filter-negative of the same color test chart. The sections of the middle layer 2 in steps E and F are filled with dotted portions which indicate that the middle layer contains a latent image but not yet any silver, the latent image in step E being the blue-filter-latent-negative of the said color test chart. Thus E illustrates the multilayer film with the still undeveloped latent image in the middle layer after the first developing step and before the additional exposure of the middle layer. The film, after the additional exposure is schematically illustrated at F, which shows again the silver images in the outer layers and the latent image still present in the middle layer 2. In addition, layer 2 shows latent impressions which are due to the exposure effected through the silver image of layer 1, on the one side, and to the exposure effected through layer 3 on the other side. Whereas in reality these latent images produced in layer 2 penetrate each other and the latent image originally present in the layer, they have been indicated, for a better illustration, near the surfaces from which the additional exposure has been made. G illustrates the film after the development of the middle layer 2. A comparison between E and G shows that the original blue-filter-latent negative of layer 2 in E has been converted into a silver image of modified characteristics. The additional blackening is the strongest in those sections which correspond to a transparent section in one or even both outer layers. H shows the film obtained after the conversion of the silver images into dye images by means of a process which yields a positive dye image from the negative silver images. The magenta dyed layer 1 is colorless at the areas of maximum silver density and the ratio of the hatched portion to the total section indicates the density of the magenta dye. The distribution and density of the yellow dye in layer 2 and of the bluegreen dye in layer 3 are indicated in the same manner.

The three dye images produced in the individual layers combine with each other to a total reproduction of the color test chart, the grey values as well as the colors being reproduced with satisfactory truth. The black area absorbs about as much blue light as green light and as red light and also the yellow area absorbs about as much blue light as the black area. By altering the illumination other conditions may also be obtained, if it should be desired, for a correction of the colors of grey-values.

What is claimed is:

1. A process for producing subtractive multicolor pictures composed of a plurality of registering dye images produced within the inseparably united silver halide emulsion layers on the support of a multi-layer light-sensitive material and formed of dyes having overlapping absorption characteristics; which comprises producing latent images of the part-images of the multicolor picture, forming each latent part-image in its corresponding silver halide emulsion layer; developing the latent image in one of the layers to form a metallic silver image therein without adversely affecting the light-recording properties of another of said silver halide emulsion layers; exposing said other layer through said metallic silver image to supplement the latent image already recorded in said other layer; developing said other layer to form a metallic silver image therein; and converting the metallic silver images into reversed dye images of the different colors respectively.

2. A process for producing subtractive multicolor pictures composed of a plurality of registering dye images produced within the inseparably united silver halide emulsion layers on the support of a multilayer light-sensitive material and formed of dyes having such overlapping absorption characteristics that the absorption of one dye overlaps more strongly the main absorption range of a second dye than the absorption of the second dye overlaps the main absorption of the first dye; which comprises producing latent part-images of the multicolor picture, forming each latent part-image in its corresponding silver halide emulsion layer; developing the latent image in one of the layers to form a metallic silver image therein without adversely affecting the light-recording properties of another silver halide emulsion layer; exposing said other layer through said metallic silver image to supplement the latent image already recorded in said other layer; developing said other layer to form a metallic silver image therein; and converting the silver image in the first developed layer into a reversed dye image formed of said one dye and the silver image in the second layer into a reversed dye image formed of said second dye.

3. A process as defined in claim 2, wherein there is used a multi-layer material with at least two layers of silver halide emulsion in superposition on the same side of the support, of which layers a layer situated nearer the support is developed after having been exposed through the image developed in a layer situated farther from the support.

4. A process as defined in claim 2, wherein there is used a multi-layer material with at least one layer of silver halide emulsion on either side of the support, of which layers a layer situated on the one side of the support is developed after having been exposed through the image developed in a layer situated on the other side of the support.

5. A process as defined in claim 2, wherein there is used a multi-layer material comprising at least three silver halide emulsion layers in superposition on the support, one of which layers is developed after having been exposed through the images developed in two other layers.

6. A process as defined in claim 2, wherein there is used a multi-layer material carrying at least one silver halide emulsion layer on the one side of the transparent support and at least two layers of silver halide emulsion on the other side of the support, of which layers a layer situated nearer the support is developed after having been exposed through an image developed in a layer farther from the support and through an image developed in a layer on the other side of the support.

7. In a process as defined in claim 1, the step of treating the multilayer film with a rapidly acting surface developer and stopping the development before all layers have been developed, illuminating the undeveloped layer through a developed layer and developing again.

8. In a process as defined in claim 1, the step of treating the multilayer film with a solution comprising a rapidly acting surface developer and a diffusion-retarder, and interrupting the development before all layers have been developed, illuminating an undeveloped layer through a developed layer and developing again.

9. A process for producing subtractive multicolor pictures composed of a plurality of registering dye images produced within the inseparably united silver halide emulsion layers on the support of a multilayer light-sensitive material and formed of dyes having overlapping absorption characteristics; which comprises producing latent part images of the multicolor picture, forming each latent part image in its corresponding silver halide emulsion layer; developing the latent image in one of the layers and fixing said layer to form a metallic image therein without adversely affecting the latent image and the light recording properties of another silver halide emulsion layer; exposing said other layer through said fixed metallic silver image; developing said layer to form a metallic silver image therein; and converting the metallic silver images into reversed dye images of the different colors respectively.

10. A process for producing subtractive multicolor pictures composed of a plurality of registering dye images produced within the inseparably united silver halide emulsion layers on the support of a multilayer light-sensitive material and formed of dyes having such overlapping absorption characteristics that the absorption of one dye overlaps more strongly the main absorption range of a second dye than the absorption of the second dye overlaps the main absorption of the first dye, which comprises using a multilayer material, at least one layer of which is dyed with a dye for the formation of the dye image having the characteristics of said second dye, the dye being resistant to ordinary photographic treating solutions, but capable of being locally destroyed with the aid of a metallic silver image; producing latent images of the part-images of the multicolor image, forming each latent part-image in its corresponding silver halide emulsion layer; developing the latent image in one of the layers other than said dyed layer to form a metallic silver image therein without adversely affecting the latent image and the light recording properties in said dyed silver halide emulsion layer; exposing said dyed layer through said metallic silver image; developng said layer to form a metallic silver image therein; and converting the silver image in the first developed layer into a reversed dye image formed of said one dye and the silver image in said dyed layer into a reversed dye image formed of said second dye, the dye image in a layer which is uniformly dyed being produced by local destruction of the dye at the points where silver is present in the layer.

11. A process as claimed in claim 10, in which all the image bearing layers are uniformly dyed with the corresponding dyes and are simultaneously treated with the dye destroying solution.

12. A process for producing subtractive multicolor pictures composed of a plurality of registering dye images produced within the inseparably united silver halide emulsion layers on the support of a multi-layer light-sensitive material and formed of dyes having such overlapping absorption characteristics, that the absorption of one dye overlaps more strongly the main absorption range of a second dye than the absorption of the second dye overlaps the main absorption of the first dye; which comprises producing latent color-sensation records of the multicolor image, forming each latent image in its corresponding silver halide emulsion layer; developing the image in one layer; thereafter developing a second layer and controlling the density of the silver deposit developed in this second layer by the density of the silver developed in the first layer, to produce silver deposits of different density at points representing identical light values of the color sensation recorded in the second layer; and converting the silver image in the first layer into a dye image formed of said one dye and the silver image in the second layer into a dye image formed of said second dye, the density of the silver deposit in the second layer being thus controlled by the silver deposit of the first developed layer, that the dye density in the second layer has its maximum value, where no dye is formed in the first layer.

13. A process for producing subtractive multicolor pictures composed of a plurality of registering dye images produced within the inseparably united silver halide emulsion layers on the support of a multi-layer light-sensitive material and formed of dyes having such overlapping absorption characteristics that the absorption of one dye overlaps more strongly the main absorption range of a second dye than the absorption of the second dye overlaps the main absorption of the first dye; which comprises, producing latent color-sensation records of the multi-color image, forming each latent image in its corresponding silver halide emulsion layer; developing the image in one layer; thereafter developing a second layer and controlling the extent of development of the silver deposit therein in proportion to the density of the silver developed in the first layer, to produce silver deposits of different density at points representing identical light values of the color sensation recorded in the second layer; and converting the silver image in the first layer into a dye image formed of said one dye and the silver image in the second layer into a dye image formed of said second dye, the extent of development of the silver deposit in the second layer being so controlled by the density of the silver deposit in the first developed layer that the dye density in the second layer has its maximum value where no dye is formed in the first layer.

14. A process for producing subtractive multicolor pictures composed of a plurality of registering dye images produced within the inseparably united silver halide emulsion layers on the support of a multi-layer light-sensitive material and formed of dyes having such overlapping absorption characteristics that the absorption of one dye overlaps more strongly the main absorption range of a second dye than the absorption of the second dye overlaps the main absorption of the first dye; which comprises, producing latent color-sensation records of the multi-color image, forming each latent image in its corresponding silver halide emulsion layer; developing the image in one layer; thereafter developing a second layer and controlling the extent of development of the silver deposit therein in proportion to the density of the silver developed in the first layer, to produce silver deposits of different density at points representing identical light values of the color sensation recorded in the second layer; and converting the silver image in the first layer into a dye image formed of said one dye and the silver image in the second layer into a dye image formed of said second dye, the extent of development of the silver deposit in the second layer being so controlled by the density of the silver deposit in the first developed layer that the dye density in the second layer has its maximum value where no dye is formed in the first layer and has a reduced value where dye is formed in the first layer such that its absorption in its main absorption range when compensated by the absorption of said one dye in the same range approximates its absorption at points where it has its maximum value.

WALTER MICHAELIS.